United States Patent
Lee et al.

(10) Patent No.: US 9,940,361 B2
(45) Date of Patent: Apr. 10, 2018

(54) INTELLIGENT PRESENCE SERVER SYSTEMS AND METHODS

(71) Applicant: UnitedHealth Group Incorporated, Minnetonka, MN (US)

(72) Inventors: Hee C. Lee, Plano, TX (US); Joseph M. Molitor, Birchwood, MN (US); Mary P. Kruse, Edina, MN (US)

(73) Assignee: UNITEDHEALTH GROUP INCORPORATED, Minnetonka, MN (US)

( * ) Notice: Subject to any disclaimer, the term of this patent is extended or adjusted under 35 U.S.C. 154(b) by 426 days.

(21) Appl. No.: 14/210,814

(22) Filed: Mar. 14, 2014

(65) Prior Publication Data
US 2014/0280243 A1    Sep. 18, 2014

Related U.S. Application Data

(60) Provisional application No. 61/791,494, filed on Mar. 15, 2013.

(51) Int. Cl.
G06F 17/30    (2006.01)
G06Q 10/10    (2012.01)

(52) U.S. Cl.
CPC .. *G06F 17/30522* (2013.01); *G06F 17/30864* (2013.01); *G06Q 10/10* (2013.01)

(58) Field of Classification Search
None
See application file for complete search history.

(56) References Cited

U.S. PATENT DOCUMENTS

| 8,380,655 | B2 * | 2/2013 | Nevin | G06Q 10/06 706/60 |
|---|---|---|---|---|
| 2003/0101083 | A1 * | 5/2003 | Venkatesh | G06Q 10/10 706/60 |
| 2007/0168345 | A1 * | 7/2007 | Gibbs | G06F 17/30684 |
| 2008/0147741 | A1 * | 6/2008 | Gonen | G06Q 10/06 |
| 2009/0292722 | A1 * | 11/2009 | Ayloo | G06Q 10/10 |
| 2013/0339387 | A1 * | 12/2013 | Duong | G06F 17/3087 707/770 |
| 2014/0156645 | A1 * | 6/2014 | Brust | G06F 17/30554 707/722 |

* cited by examiner

*Primary Examiner* — Christopher J Raab
(74) *Attorney, Agent, or Firm* — Dorsey & Whitney LLP (57) ABSTRACT

A method for directing inquiries to available subject matter experts includes storing an expert database in memory and defining presence states to describe present attributes of each subject matter expert with respect to a number of resource elements. Inquiries are directed to the experts, and response histograms are populated based on whether a response was obtained in a given presence state. The response histograms describe or define a response probability for each subject matter expert, as a function of the corresponding present attributes for each of the resource elements.

16 Claims, 6 Drawing Sheets

| SME0 | | | | | | |
|---|---|---|---|---|---|---|
| MARE Element | A. Office Phone | B. Network Presence | C. Calendar | D. IM | E. Business Apps | F. Add'l |
| MARA Attributes | On/ Off | Online/ Offline | Meeting/ Tentative/ Free | On/Off session | Active/ Inactive — Proficiency/ Workload | ... |
| Assigned Values | {1, 2} | {1, 2} | {1, 2, 3} | {1, 2} | {1, 2} {11, 12} | ... |
| SME1 | | | | | | |
| MARA C(i,.) | 1 | 1 | 2 | 2 | 1, 11 | ... |
| SME2 | | | | | | |
| MARA C(i,.) | 1 | 2 | 2 | 1 | 2, 12 | ... |

Fig. 3A

| | A | B | C | D | Group Membership |
|---|---|---|---|---|---|
| SME1 | | | | | G1 |
| MARA C(t₁) | 1 | 1 | 2 | 2 | |
| C(t₂) | 1 | 2 | 1 | 2 | |
| ... | | | | | |
| SME2 | | | | | G1 |
| MARA C(t₁) | 1 | 2 | 2 | 1 | |
| C(t₂) | 2 | 1 | 1 | 1 | |
| ... | | | | | |
| SME3 | | | | | G2 |
| MARA C(t₁) | 1 | 1 | 2 | 1 | |
| C(t₂) | 1 | 1 | 1 | 1 | |
| SMEj | | | | | G1, G2 |
| MARA C(t₁) | 1 | 1 | 2 | 1 | |
| C(t₂) | 1 | 1 | 2 | 1 | |

INTELLIGENT PRESENCE SERVER SYSTEMS AND METHODS

CROSS-REFERENCE TO RELATED APPLICATIONS

This application claims priority to U.S. Provisional Application No. 61/791,494, filed Mar. 15, 2013, entitled INTELLIGENT PRESENCE SERVER SYSTEMS AND METHODS, and which is hereby incorporated by reference herein, in the entirety and for all purposes.

FIELD

This disclosure relates generally to computer-based server systems, and specifically to communications servers. In particular, the disclosure relates to server systems and methods for communication with subject matter experts having expertise in particular areas.

BACKGROUND

In many businesses there are workflows in which subject matter experts (SMEs) are consulted as an essential part of a given process. For example, many businesses have call centers that receive calls from clients or customers who present a transaction or a problem that is not always resolvable in the incoming call. Other businesses have email or online points of entry for taking in such transactions or problems.

Often these transactions and problems are recorded in a ticket, which initiates a workflow process leading to completion or resolution. The initiated process may be handled wholly or partly by a person who will need to consult with one or more subject matter experts.

In other cases, the process can be handled largely by a business application (or software-based system) that will at some point call on a subject matter expert to review a portion of a file, and/or respond to a request and provide necessary input. In such cases, the expert will receive a communication from the system, requesting some action in a workflow. When a workflow cannot progress without the expert's input, and particularly when it is time sensitive, it is important that the expert receiving a communication request is available to provide input.

In many cases, the subject matter expert response is needed within a very short time frame. This means that the expert must be available to address the request, or the organization's response will be too slow. Unlike a person assigned a call center, whose job is to take the next call, subject matter experts may have other tasks, some with higher priority than a particular expert response function that may be part of workflow. Thus, the response depends on the availability of the expert, at the time the communication request is issued.

SUMMARY OF THE INVENTION

This disclosure is directed to computer implemented systems and method for initiating and facilitating communication requests to subject matter experts, in a pool or plurality of such experts. Tables of availability probabilities or other availability measures are stored in memory for each of the experts, for example by a communication pattern analysis module. Each table is derived from particular experts' prior history of responses to inquiries, which are issued on a broadcast basis.

The tables are built up from a plurality of presence states (e.g., $C_{ijk}$ . . . ), indicating present activity of each subject matter expert. Various program modules are provided to collect current presence state data for each expert in the pool, and to compute a current availability probability or availability index for each expert based on the corresponding presence state C. Subject matter experts with the highest current availability probabilities are identified, and communications requests are initiated to the identified subject matter expert or experts.

DETAILED DESCRIPTION

The computer-implemented systems and methods described herein relate to communication. In particular, these systems and methods facilitate communication with subject matter experts (SMEs) by computing presence data or presence states for each of multiple subject matter experts, and generating a probability or other measure of availability in order to guide communication requests to individual subject matter experts, based on the presence data.

Various schemes have been developed to determine when a business person is available to respond to a consultation request an organization hopes to pass on to that person. The key differentiator of Unified Communication services has been their ability to provide users presence information and presence-enabled communication services for end users. The basic definition of presence in the context of Unified Communication is information provided by a computer-based system that provides data on real-time availability of a user. Such users can include Subject matter experts with whom others wish to communicate for various forms of consultation.

Common basic states of presence for a user are "Available," "Busy," and "Away." Since the Unified Communication applications started to take advantage of this simple availability concept of presence about five years ago, it has been further advanced, not only to include communication capabilities of a user (and multiple types of presence data) but also to identify the most effective way of communication at a given point of time and in a given environment.

The benefits of presence awareness capabilities in the systems implementing Unified Communication have been well known and well documented in the industry. The simple fact is that if the system provides information about the real-time presence state of the other party with whom a user is trying to connect, the user can initiate a communication with the other party when that party is likely available and use a communication channel by which the other party is most reachable, without going through a number of sequential attempts to find the most optimal communication medium based on educated guesses or trial and error. For example, if the real-time presence of the other party is not known, the request originating party may try the subject matter expert/recipient's office phone first, cellular phone second, and email third. If presence information is known, the request originating party may try another subject matter expert or try email when an office phone is shown in use. Thus, using presence information available in a system, one can reduce the latency of interactions and at the same time increase the effectiveness of the communication. The same principle can be applied to communications essential to an automated workflow process. Having presence information for communication recipients can help to determine that the right experts are available, including when/where/how they are available, before the business application reaches out to them to solve a business problem within its defined workflow.

A general presence server in a Unified Communication system usually consists of a number of functional components (implemented in software and hardware) including a presence manager component that collects presence raw data electronically from various sources such as telephone systems (line busy or idle), electronic calendar (meeting schedules) and a user device operating system (which indicates whether a user is currently interacting with a device, e.g., keyboard activity or has certain applications running, such as a network-based meeting system). Then it aggregates and publishes these data to communication applications or other presence servers in real-time. Either a presence rules engine in the presence server or a communication application processes the presence data and determines a presence state of a user. For example, if the presence data of a user that has been collected and stored indicates that the user's office phone is idle, the person has no meeting scheduled, and a communication application detects key strokes from the computer key board, a computation may determine that the user is "Available."

While there are a number of different ways to utilize the presence information, it is generally true that the accuracy of user presence state information directly impacts the effectiveness of Unified Communication and its associated applications. A typical presence server determines a user presence state based on applying availability rules to the user's device usage information or other information that has been collected for the server. The presence server can detect a user's opened communication application in their desktop computer, but it does not know for sure if the user is in the room and available to accept an incoming communication request. Integration of calendar information into the presence server is also a common practice today. A user's calendar includes not only information of his/her current schedules, but also planned future activities. This enhances the presence server's user presence state capability. However, it is also known that many people use a calendar to block their true accessibility from others by scheduling "meetings" in their calendar that are not really meetings. Such a meeting may have different meanings for different people; it may represent some qualified form of availability for a particular person, rather than total unavailability. Therefore it is a fact that the presence server cannot generate an availability of a user with complete certainty, using conventional analysis of typical presence data.

Despite of the limitations of a presence server, it has been a key enabling technology that improves the efficiency and effectiveness of communications, especially within person-to-person communication. In order to select a communication means to connect with others, one person may review the presence information collected and accessible in a presence server of the target party and apply a reasoning process. For example, if you have an urgent communication need with a specific person and learn the person is on a phone, you may send an "instant" text or other message (IM) to the person instead of trying to call his phone. In another situation, you may dial a person's office phone while the presence state of the person indicates that he or she is in a meeting, because you think the person may answer the phone even if the presence server data states that he or she is not available. The presence information of a target user greatly helps human reasoning processes in determining the most effective communication method at the given time. However, when we integrate the presence server capability, i.e. availability of users or experts, with business applications that require a response from a person, the human reasoning process for interpreting presence data may be completely eliminated. The business application typically has no effective way to evaluate the data available on the presence server and maximize the chance of communicating with the target. Therefore, the effectiveness of a presence server is greatly reduced when it is used with business applications. Even when the human reasoning process is available, better analysis of presence data may aid that reasoning process.

The present system and method address the difficulty of applying a human reasoning process to presence server information, including situations where automated business applications are used in workflow, by providing a new intelligent presence system for facilitating communications.

1. System Component Overview

Figure 1:
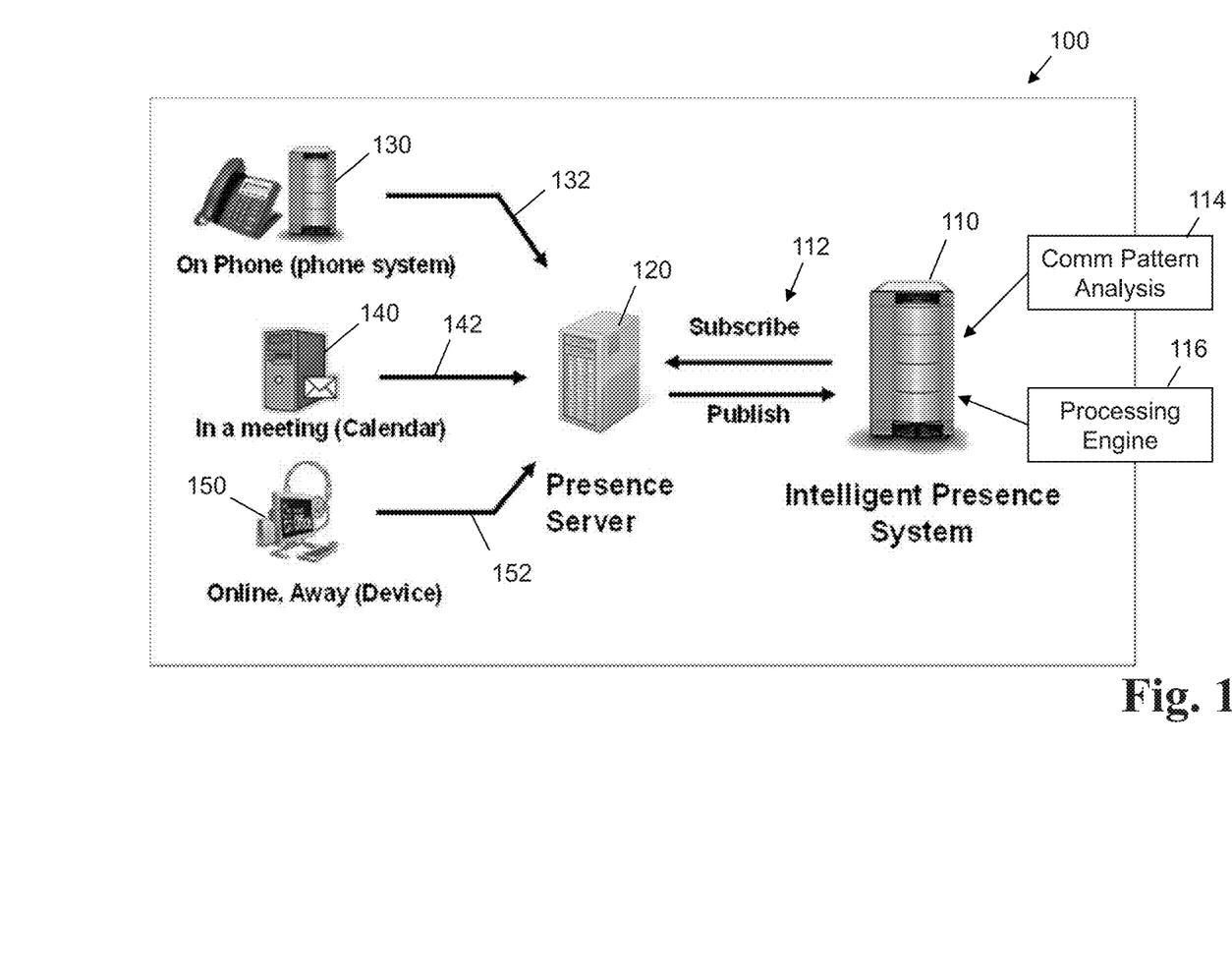
FIG. 1 is a schematic illustration providing a high-level overview of the components in an intelligent presence system.

The role of an intelligent presence system is to provide business applications with the most accessible and appropriate subject matter experts and resources at the right moment during a workflow process with the right communication channel selection (see also below) to support achieving the business goals. As seen in FIG. 1, in the system 100 described herein, the Intelligent presence system 110 leverages the common presence server 120 available in the market, e.g., Unison, from Unison Technologies, Inc. of NYC, NY. In general, a common presence server 120 operates in 'Subscribe' and 'Publish' mode using a communication channel 112, such as a network, to link to the intelligent presence system 110. The presence server 120 aggregates and filters presence information collected from various presence data sources such as telephone systems 130 (via communication link 132), electronic calendars 140 (via communication link 142) and user devices 150, such as a desktop computer and its application or operating system software (via communication link 152). Upon request from applications, clients, or other presence servers, the presence server 120 provides the requestor with presence information. As shown in FIG. 1, the intelligent presence system 110 subscribes to presence information published by the presence server 120.

The presence information acquired from the presence server is used at two different stages as described in the following:

1. Populate an historical base of communication behavior data of a target SME group in a given period. This data set is used to analyze in the given period each SME's communication behavior or patterns of how they manage requests from (e.g., specific) workflow processes or applications.
2. Provide real time state data of various communication channels or other presence data sources of each SME. This information is used as input to the intelligent presence system to predict the SME's willingness to respond to a support request coming in from specific business application(s) and to identify the most effective way of communication at a given point of time and in a given environment.

The infrastructure of the intelligent presence system consists of a general purpose computer (CPU and memory, operating system) in which execute two functional modules—the communication pattern analysis module 114 and the processing engine module 116. A functional description of each module is detailed in the following subsections.

The general-purpose computer has a central processor which is connected to a system memory, a source of data inputs and other input/output devices. More particularly, the computer system typically includes at least one main unit connected to both one or more output devices which store information, transmit information or display information to one or more users or machines and one or more input devices which receives input from one or more users or machines. The main unit may include one or more processors connected to a memory system via various interconnection mechanisms. Any input device and output device also is connected to the processor and memory system via various interconnection mechanisms. The general-purpose computer system is programmable using various computer programming languages. Computer programming languages suitable for implementing such a system include procedural programming languages, object-oriented programming languages, combinations of the two, or other languages. The various functions implemented in computer programming languages may be viewed as implemented in software components or modules, which often comprises a large number of sub-components or sub-modules.

In a general purpose computer system, the processor is typically a commercially available processor which executes a program called an operating system which controls the execution of other computer programs and provides scheduling, debugging, input/output control, accounting, compilation, storage assignment, data management and memory management, and communication control and related services. The processor and operating system define a computer platform for which application programs in various computer programming languages are written. The invention is not limited to any particular processor, operating system or programming language.

A memory system typically includes a computer readable and writeable nonvolatile recording medium in which signals are stored that define a program to be executed by the processor or information stored in the medium to be processed by the program. Typically, in operation, the processor causes data to be read from the nonvolatile recording medium into another memory that allows for faster access to the information by the processor than does the nonvolatile recording medium. This memory is typically a volatile, random access memory such as a dynamic random access memory (DRAM) or static memory (SRAM). The processor generally manipulates the data within the random access memory and may copy the data to the nonvolatile recording medium after processing is completed. A variety of mechanisms are known for managing data movement between the nonvolatile recording medium and the random access memory element, and the invention is not limited thereto. The invention is not limited to any particular memory system.

2. Communication Pattern Analysis Module

The communication pattern analysis module 114 collects each subject matter expert's communication usage history along with states of all those communication tools or applications (e.g., in FIG. 1, phone system 130, calendar 140 and desktop device 150) that are associated with the subject matter expert and considered relevant to determining availability. To populate meaningful data from which to derive recognition of the subject matter expert's communication behavior and pattern, the following three dimensional data structure 200 (shown schematically in FIG. 2) is created.

Figure 2:
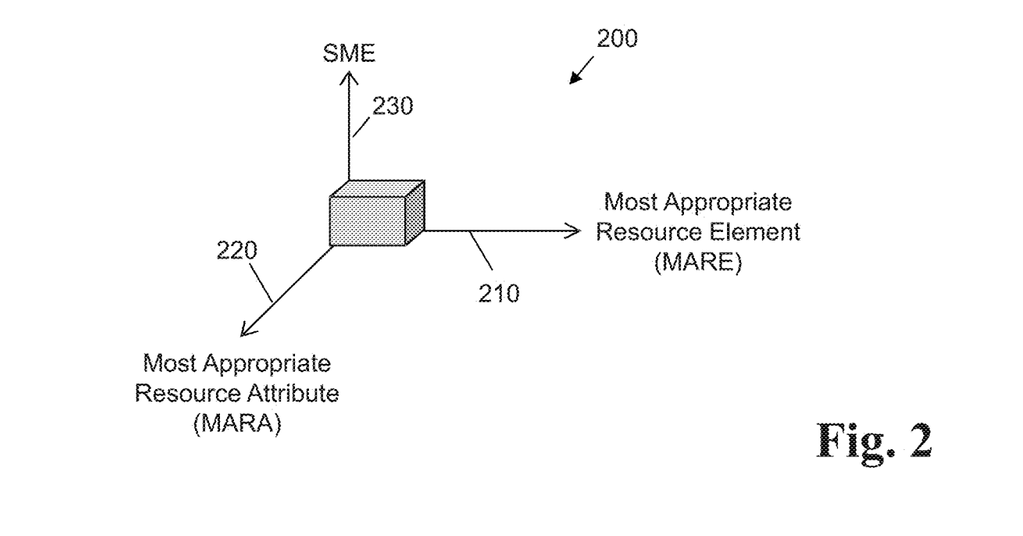
FIG. 2 is a high-level view of a communication pattern data structure for use with the intelligent presence system to store presence data.

1. Most Appropriate Resource Element (MARE) 210: MARE is a list of all relevant communications tools or applications that are associated with a subject matter expert. The basic MARE starts with office phone, network presence, and calendar. The list can be extended as more communication tools and applications are used by a subject matter expert or organization such as cellular phone, Instant Messenger, location information, and business applications running on a desktop device. For example, MARE={office phone, network presence, calendar, IM (text), business application(s), etc.}
2. Most Appropriate Resource Attribute (MARA) 220: MARA consists of a set of attributes that describes the current state of each element in MARE. The states define for each element its status or mode of use at the point in time the attribute is polled, or when it reports to the presence server 120.
3. SME list 230: The SME list consists of identifications or user names of subject matter experts within a specific functional group. A data set with MARE and MARA attributes exists for each SME.

Table 1 shows exemplary attribute possibilities for a MARE set with five elements, and the corresponding MARA data sets.

TABLE 1

MARE ELEMENTS AND CORRESPONDING MARE ATTRIBUTES

| MARE Element | MARA Attributes |
| --- | --- |
| Office Phone | (on-hook, off-hook) |
| Network Presence | (online, offline) |
| Calendar | (meeting, tentative, free) |
| IM (text) | (on-session, off-session) |
| Business Application(s) | (active, inactive, proficiency levels, work load) |

For computational purposes, it is useful to define a presence compound or state vector $C_{ijkl}$ ... for data in the data structure. The presence state vector $C_{ijkl}$ ... (or simply C) represents a blend of presence or availability various attributes (e.g., MARA attributes), for example attributes of the first four elements of MARE defined above. That is:

i represents an index or indicator of the MARA attribute corresponding to a particular MARE element; for example, "office phone," with two possible MARA attributes: i=1 (on-hook), and i=2 (off-hook). If a particular SME is on the phone, for example, then the corresponding state vector entry will be i=1.

j represents an index or indicator of the MARA attribute corresponding to a second MARE element; for example "network presence." This MARE element also has two corresponding MARA attributes: j=1 (online), and j=2 (offline). Thus, if the desktop client detects SME network activity, then j=1; otherwise, j=2.

k represents an index or indicator of the MARA attribute corresponding to a third MARE element; for example. "calendar." This MARE element has three corresponding MARA attributes: k=1 (in-meeting), k=2 (tentative); and k=3 (free). Thus, if SME's calendar indicates that SME has no meeting scheduled, k=3.

l represents an index or indicator of the MARA attribute corresponding to a fourth MARE element "text." This element has two attributes: l=1 (in-session, or texting), and l=2 (off-session, or not texting). Thus, if a particular SME is not engaged in a text or other instant-messaging type application system, then l=2.

In this example, the compound presence state of the subject matter expert is $C_{1132}$, representing (office phone is on-hook, expert is online, free or unscheduled, and not texting). This compound quantity may also be viewed as a state vector with four elements or components.

For simplicity, the above example includes only the first four elements of MARE defined above, each of which has only two or three possible MARA values. The fifth MARE element, business applications, may include software running on the subject matter expert's desktop, such as a network-based meeting software, WORD, an internally developed business workflow tool, or other software tools used by the subject matter expert, the use status or activity level of which can be reported by the operating system of the subject matter expert desktop to the presence server 120 or may be reported directly to the intelligent presence system 110.

In fact, the compound presence state may include status or activity level data of one or more business applications, such that there may be useful presence related data included as fifth, sixth, seventh, etc., MARE. A presence compound with additional elements, e.g., $C_{ijklm}$, or $C_{ijklmn}$, may be defined, as additional elements become part of the communication presence data relevant to availability of a subject matter expert, but C is more general. It is for simplicity of explanation that the discussion and examples proceed mainly with four or fewer MARE and mainly MARA that can assume on two or three values. This limits the number of $C_{ijkl}$ that need to be used in examples; more generally, a given presence state vector C may have any number of entries, each corresponding to a different MARE element with a given number of MARA attributes.

It may also be useful to derive a metric or scalar quantity from the data in the state vector. The total number N of a presence compound or state vector C, for example, may be determined by:

$$N = O \times P \times Q \times R \quad [1]$$

In this expression, O is number of MARA attributes corresponding to the first MARE element (MARE A, "office phone," with two attributes i=1 or 2 for the on-hook and off-hook attributes). Similarly, P is number of MARA attributes for the second MARE element (MARE B, networking or online/offline; j=1 or 2), Q is number of MARA attributes for the third MARE element (MARE C, calendar; k=1, 2, or 3), and R is number of MARA attributes for the fourth MARE element (MARE D, texting; l=1 or 2).

In this particular example, the number N of state vector C is twenty-four (2×2×3×2=24), so there are twenty-four different ways to configure the presence compound, based on all the different possible attributes of the office phone, network, calendar, text and elements. Alternatively, the individual attribute values i, j, k, l (and m, n . . . ) can be combined in other ways, in order to generate a scalar associated with the availability of a particular subject matter expert, based on the current state vector.

Figure 3A:
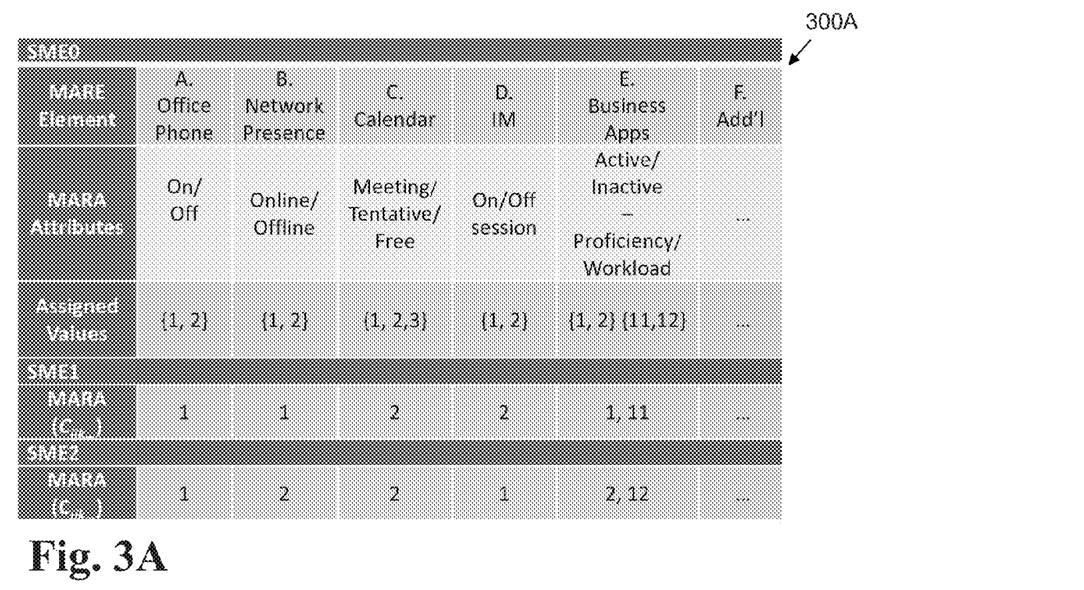
FIGS. 3A and 3B show in a tabular form possible fields and field values for exemplary entries in the data structure of FIG. 2.
Figure 3B:
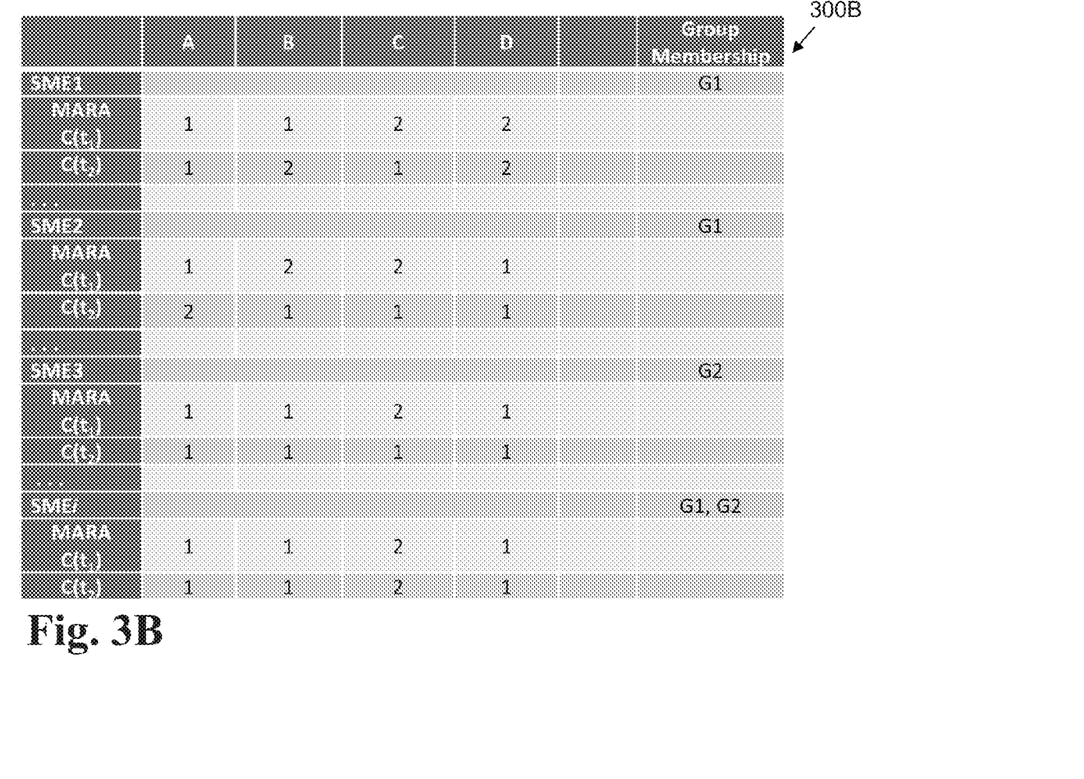

Another view of the data structure 200 in FIG. 2 is presented in the simplified representative examples of FIGS. 3A and 3B. In FIG. 3A, the data can be viewed as one large Table 300A, with a set of rows for storing MARA attributes (index or indicator values that) may exist at one or more points in time, for each of the five MARE elements A-E, and any additional elements F.

As shown in FIG. 3A, the first four rows of Table 300A show the general format for the data for one subject matter expert (SME0), sorted by data field and then the range of values that may appear in the field. The next four rows show for two exemplary subject matter experts, SME1 and SME2, how the actual data values that define a presence compound state $C_{ijkl}$ (or C) for the subject matter expert at one point in time might look. It will be understood that the MARA data will be changing constantly, based on subject matter expert activity. The MARA data may be collected at whatever interval provides sufficiently current data for the subject matter experts that are the targets of user inquiries, or the MARA data may be polled at a point in time where an updated reading on subject matter expert availability is needed.

FIG. 3B is a simplified representative example showing in Table 300B the four MARE elements (MARE A-MARE D) are selected as defined above, with number N=24. The different MARA values or state vectors C that may exist are provided at two different points in time, $C(t_1)$ and $C(t_2)$. It will be understood that such data may be stored for many hundreds or thousands of points in time ($t_3, t_4, t_5 \ldots$) will typically be stored for each of a group of subject matter experts.

Table 300B also shows that the MARE/MARA data are kept for each subject matter expert, and that each expert may belong to a particular group of subject matter experts, based on some shared expertise that permits defining a pool of experts that can be communication targets for a particular business application at a particular point in its workflow. Table 300B shows SME1 and SME2 as members of group or pool G1, while SME3 is a member of group or pool G2 and SME4 is a member of both G1 and G2.

In order to generate histograms of a particular subject matter expert's presence states that directly impact the expert's communication behavior and pattern, an integer variable presence compound counter $I(C_{ijkl})$, is defined for the above presence compound with number N=24, with four MARE elements for each subject matter expert. Thus, with a sampling of $C_{ijkl}$ at various points in time, a history of the states of each expert's presence can be recorded over a period of time. Each sampling can be identified with a counter value $I(C_{ijkl})$.

3. Data Collection

Figure 4:
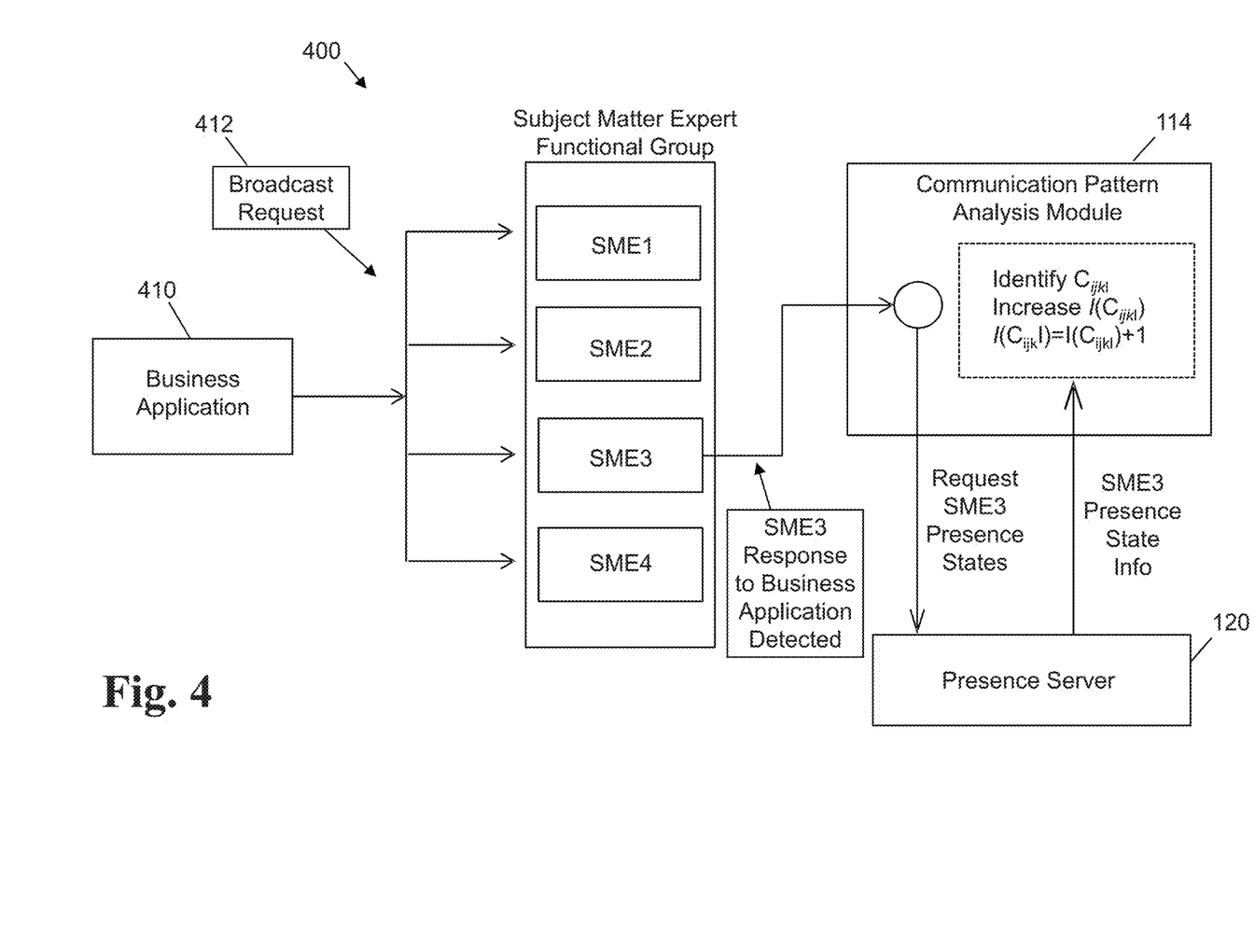
FIG. 4 shows a data collection process underlying an initial loading of data in the data structure of FIGS. 2, 3A and 3B.

In order to have a sufficient amount of data to recognize a subject matter expert's communication behavior and pattern, the expert's presence state information is collected over a period of time, e.g., a month. The data collection process performed by the Communication Pattern Analysis module 114 is illustrated at FIG. 4. During the data collection period, the incoming communication requests from a business application 410 will be broadcast 412 to all subject matter experts in the given expert functional group for which data is sought.

When a particular subject matter expert responds to a request or fails to respond (FIG. 4 shows a response from SME3), the Communication Pattern Analysis module 114 of intelligent presence system (IPS) 110 acquires real time presence states of all communication tools or applications that are MARE associated with the subject matter expert from a presence server 120. Based on the presence information returned, the communication pattern analysis module 114 identifies a presence compound $C_{ijkl}$. Once a correct $C_{ijkl}$ is determined, a counter variable $I(C_{ijkl})$ in Communication Pattern Analysis module 114 is increased by 1:

$$I(C_{ijkl}) = I(C_{ijkl}) + 1 \qquad [2]$$

The counter variable $I(C_{ijkl})$ can thus be used to count the number of times a particular one of the states $C_{ijkl}$ (or C) is encountered in the presence server data for a subject matter expert existing when a broadcast communication request is made, along with a count of the number of times the expert, when in a particular state, provides a response to accept the communication request. These counts thus permit a body of historical data to be built up that shows, for each subject matter expert the response/no response data for a number of occurrences of each of the possible states $C_{ijkl}$ in which a subject matter expert may be found when a communication request is delivered, for example as shown in Table 2.

This is a simplified example for a case with two different MARE elements, each of which has two possible MARA attributes, so that the state vector $C_{ij}$ has number N=4. Representative (arbitrary) data for such a two-by-two element MARE/MARA (feature/attribute) case are presented in Table 2.

In this simplified example, when a communication request came in this particular subject matter expert (SMEi) was most often in state $C_{11}$ (38.6%) or state $C_{22}$ (34.1%), and in each of these states the expert responded to the communication requests at a rate of less than ten percent (about 5.9% and about 6.7%, respectively). Communication requests were less likely in states $C_{12}$ and $C_{21}$ (13.6% each), but the requests were much more likely to be answered (33.3% for state $C_{12}$, and 50% for state $C_{21}$).

TABLE 2

MARE ELEMENT/MARA ATTRIBUTE
INDEXING SMEi: $I(C_{ij})$

| $C_{11}$ | $C_{12}$ |
|---|---|
| # times state encountered when request made: $I(C_{11})$ = 170 (38.6% of total) | # times state encountered when request made: $I(C_{12})$ = 60 (13.6%) |
| # times SME in this state responded to request: $n(C_{11})$ = 10 | # times SME in this state responded to request: $n(C_{12})$ = 20 |
| Availability (probability) $P(C_{11})$ = 5.9% | Availability (probability) $P(C_{12})$ = 33.3% |
| $C_{21}$ | $C_{22}$ |
| # times state encountered when request made: $I(C_{21})$ = 60 (13.6%) | # times state encountered when request made: $I(C_{22})$ = 150 (34.1%) |
| # times SME in this state responded to request: $n(C_{21})$ = 30 | # times SME in this state responded to request: $n(C_{22})$ = 10 |
| Availability (probability) $P(C_{21})$ = 50.0% | Availability (probability) $P(C_{22})$ = 6.7% |

Such data can also be presented in histogram form. Although these data would be derived from a specific data collection period, they may be used to develop generalizations about the subject matter expert's availability patterns. It will be seen that these data could be updated, as additional response data associated with each of the states is accumulated in a non-test environment with real communication requests incoming. It will also be seen that these data could be broken down further by showing for each state $C_{ij}$ (or C) the nature or mode of the communication request that did not or did not result in a response. These data can provide information about which communication request modes are more successful, for each subject matter expert SMEi, in each state C (or $C_{ijk}$ ...).

4. Availability Probability Computation

A purpose of the present system is to guide a business application that needs a communication with one of a particular group of subject matter experts. Ideally, the business application 410 will attempt to initiate communication with a communication request directed to the subject matter expert that will be most likely to be available to dispose promptly of whatever the subject matter expert consultation need is of the business application. A "Most Appropriate Resource Score" (MARS) is a computed indicator that predicts the degree of subject matter expert's availability upon a request from a business application. Thus, the intelligent presence system (IPS; alternatively, intelligent presence server IPS) uses the processing engine module 116 to perform computations of the MARS for each of a target group of subject matter experts and provides a list of subject matter experts based on evaluation of MARS at a given communication and work environment.

The MARS probability or $P(C_{ijkl})$ is a function of the response history obtained for each expert SMEi in each different presence compound or state vector $C_{ijkl}$. The result is an availability probability that is derived from histogram data generated during a given data collection period, for example over the course of a year or more, or using rolling monthly, quarterly, or yearly data sets.

In general, the range of $P(C_{ijkl})$ may be constrained to be in the range [0,1]. One particular form or computational model is expressed symbolically as follows:

$$P_0(C_{wxys\ldots}) = \frac{R(C_{wxyz\ldots})}{I(C_{wxyz\ldots})}, \qquad [3]$$

which gives the probability of a response in each state $C_{ijk}\ldots$, as described above, and where the state or presence compound is defined by i=w, j=x, k=y, l=z, etc.

Alternatively, a more complex form can be defined, for example:

$$P(C_{wxys\ldots}) = \frac{n_1(C_{wxyz\ldots})}{\sum_{i=1}^{O}\sum_{j=1}^{P}\sum_{k=1}^{Q}\sum_{l=1}^{R}\ldots n_2(C_{ijkl\ldots})}, \qquad [4]$$

where the sums run according to the number of MARA attributes for each MARE element, and the w, x, y and z variables select particular attribute indexes or indicator values i, j, k and l from among the attributes; that is, with $1 \leq w \leq O$, $1 \leq x \leq P$, $1 \leq y \leq Q$ and $1 \leq z \leq R$.

Thus, the function $P(C_{wxyz}\ldots)$ can normalize the number of responses (or other histogram variable) $n_1$ in a particular state $C_{wxyz}\ldots$ by the sum of all corresponding inquiries (or other histogram variable) $n_2$ for all possible states $C_{ijkl}\ldots$. That is, where $P_0(C_{wxyz}\ldots)$ gives the probability for a response from a particular subject matter expert in a particular state $C_{wxzy}\ldots$, the expression $P(C_{wxyz}\ldots)$ gives the fraction of responses $n_1 = R(C_{wxyz}\ldots)$ that were obtained in a particular state $C_{wxyz}\ldots$, as compared to the total number of inquiries $n_2=\Sigma I(C_{ijkl} \ldots)$ in all the other states $C_{ijkl}\ldots$. More generally, individual variables $n_1$ and $n_2$ may be the same or different, and may include any of responses R, inquiries I, non-responses I-R, or other histogram variable. Thus, the "probability of response" or probability measure P (or $P_0$) has quite generally form, and all of these forms are encompassed as potential factors for selecting a particular subject matter expert to answer a particular question or inquiry, using the value of these measures as a function of the presence states of the subject matter experts, and in particular based on the present MARA attributes of the selected subject matter expert, at the time of inquiry or selection.

The historical data collected can thus provide a variety of metrics that indicates for a given reported subject matter expert presence state, a probability of a response of a particular subject matter expert.

Once the MARS values are computed from historical data, they are stored in a MARS table for each subject matter expert. The MARS table data, which exist for each subject matter expert and which has a cell for each state $C_{ijkl}\ldots$ and a probability value for a response to a communication request to this subject matter expert and the subject matter expert's states $C_{ijkl}\ldots$ is used to determine the most appropriate resource when a business application requests a subject matter expert from a functional group.

As described next, the values in the MARS table ideally show a probability of availability for each subject matter expert and for any state $C_{ijkl}\ldots$ that may exist for such subject matter expert when a business application 410 has a need. Thus, if the probability of availability corresponding to a particular state of a subject matter expert is low, that subject matter expert is a poor candidate for a response and the business application 410 should not direct a communication request to that subject matter expert. Rather, the business application 410 should direct its communication request to the subject matter expert with a current state that makes it the subject matter expert with the highest probability of availability at the point in time of the report of presence data and the availability analysis based on that data. If the histogram data also includes data on the mode of communication used with each communication request, this can permit a further breakdown of data showing probability of availability based on the mode of communication used with a communication request.

As subject matter experts' communication patterns and behavior can be gradually changed over time, MARS tables are refined periodically as more of the subject matter expert's presence data is collected. That is, for communication requests not made on a broadcast basis and made after that given period of data collection the response of a subject matter expert when it is subject to a communication request and is in a particular state $C_{ijkl}\ldots$ can become part of the above calculation of an updated MARS $P(C_{wxyz}\ldots)$ or $P_0(C_{wxyz}\ldots)$.

5. Processing Engine Module

Figure 5:
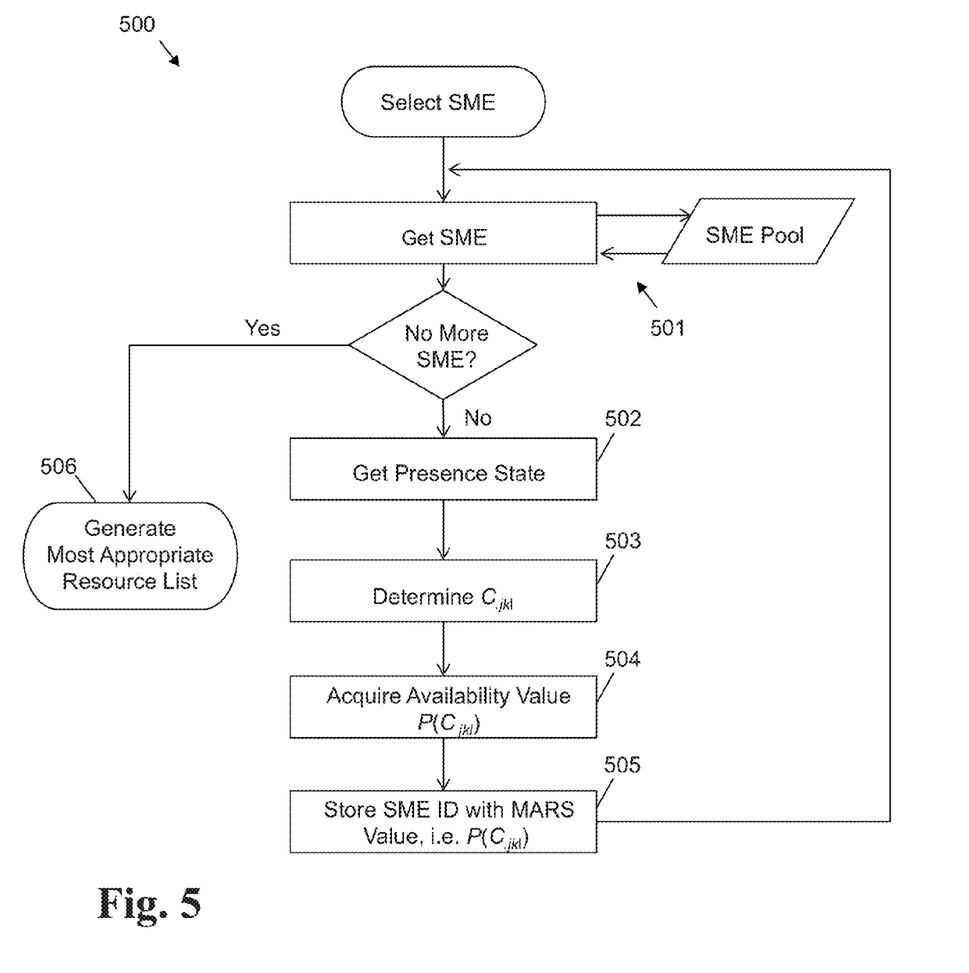
FIG. 5 is a block diagram or flowchart illustrating a process for selection of a subject matter expert based on a computed availability probability.

In response to a subject matter expert communication request from a business application at a particular point in time, the processing engine module 116 performs a computation that selects the most appropriate subject matter expert in a particular expertise group or subject matter expert pool for initiating the needed communication request by a business application 410. The flow of the subject matter expert selection process is illustrated at FIG. 5.

In general, when a business application 410 wants to initiate a subject matter expert communication, the engine 116 determines the presence state $C_{ijkl}\ldots$ of each candidate subject matter expert in the functional group of interest to the application (subject matter expert pool) and, from that $C_{ijkl}\ldots$ and the stored MARS tables for that subject matter expert, determines the MARS $P(C_{wxyz}\ldots)$. When this is done for all subject matter experts in the expertise group (pool) of interest they all can be ranked by availability and/or the subject matter expert with the highest MARS $P(C_{wxyz}\ldots)$ can be identified to the business application or a communication request can be initiated to the identified subject matter expert on behalf of the business application. The steps of the process are as follows.

Step 501: SME pool contains a list of subject matter experts of the functional group. It returns a subject matter expert ID at each request. If there are no more available subject matter expert IDs to return, it simply returns null value.

Step 502: Get presence states of all communication tools and applications used by the SME from $3^{rd}$ party presence server.

Step 503: Based on the presence state of each communication application, the index values of i, j, k, and l (etc.) are determined.

Step 504: As the presence compound $C_{ijkl}\ldots$ determined at earlier step identifies a unique blending of attributes of all elements within MARE, its availability probability $P(C_{ijkl}\ldots)$ can be read from a MARS table. The MARS $P(C_{ijkl}\ldots)$ expresses the subject matter expert's availability level at the given time and the SME's environment.

Step 505: The subject matter expert's ID and its associated MARS value $P(C_{ijkl}\ldots)$ are stored at a candidate table for final selection process at a later step. The earlier steps are then repeated for the next subject matter expert.

Step 506: When a current MARS value $P(C_{ijkl}\ldots)$ is computed for each subject matter expert in the pool, the candidate table is sorted in descending order of MARS values $P(C_{ijkl}\ldots)$. The subject matter expert or experts with highest MARS scores are selected for a communication request. Alternatively, the first subject matter expert having a sufficiently high availability measure or probability may be contacted on identification of such a score over a predetermined threshold, without going through the entire list.

Step 507: The business application may then initiate a communication request to the subject matter expert.

If data have been collected that include data on the mode of communication used with each communication request, MARS values $P(C_{ijkl}\ldots)$ can be supplemented with an additional datum, which states the probability of availability based on the mode of communication used with a communication request. This can be based on both logic derived from a subject matter expert's set of available communication tools and applications and on collected data. Thus, for a given $C_{ijkl}\ldots$, there may be a $P_1$ when the communication request is to a cell phone and a different $P_2$ when the communication request is to a desk phone, corresponding, for example, to the $P_0$ probability of response operator for different states $C_{wxyz}\ldots$ or $C_{ijkl}\ldots$, as described above.

6. Healthcare Call Center Example

Figure 6:
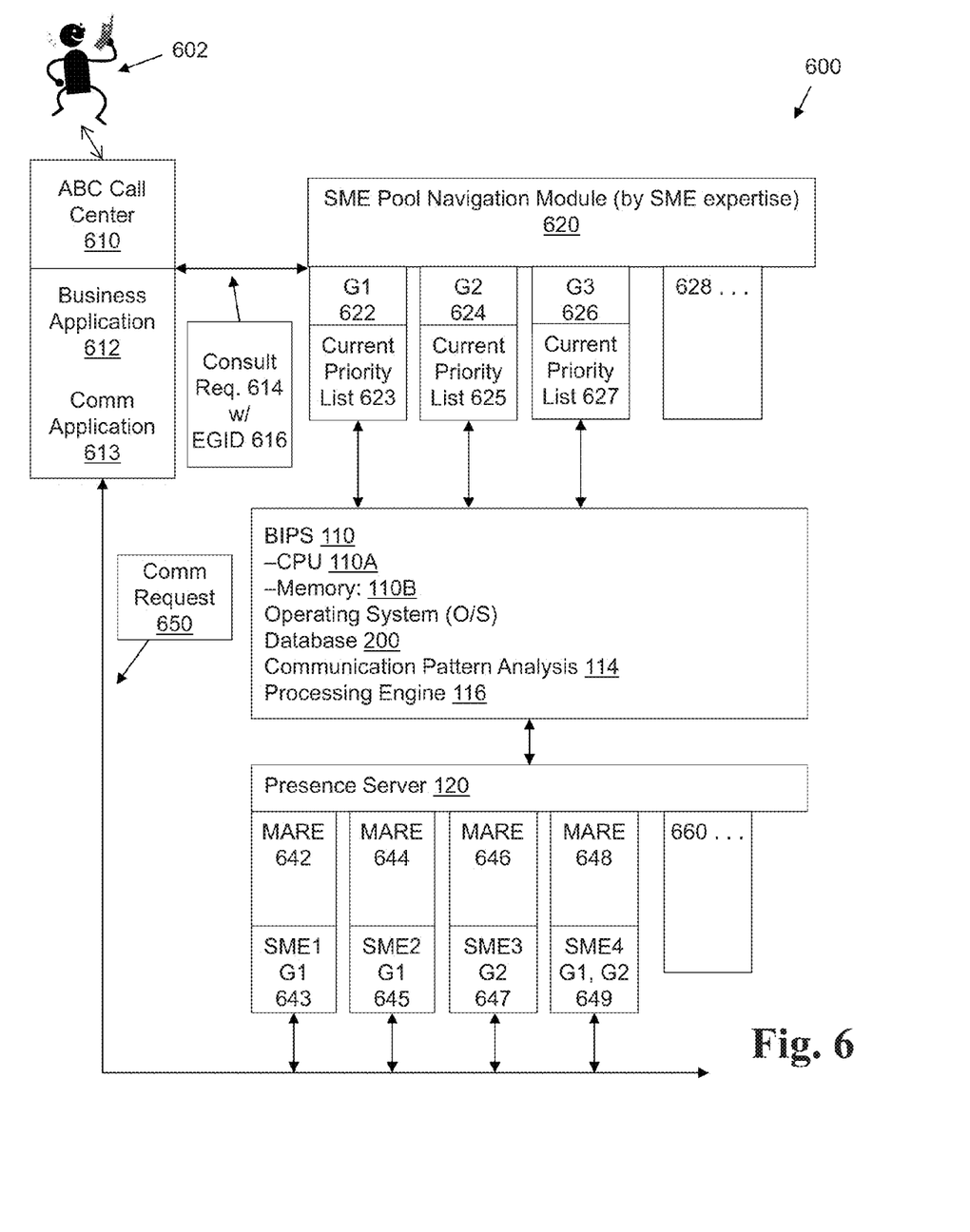
FIG. 6 is a block diagram of components and information flow for the intelligent presence system of FIG. 1, for example as configured to perform selection of an available subject matter expert to be consulted by a benefits inquiry or other business application.

FIG. 6 shows in schematic form a representative example of the present system and method used to perform selection of a subject matter expert consulted by a benefits inquiry business application. The following use case example describes the role of intelligent presence system within a healthcare call center workflow process.

As seen in FIG. 6, the present system and method is implemented in the components 600, which correlate in part with those in FIG. 1. In particular, the components 600 include a presence server 120 that collects MARA data from a plurality of subject matter experts. By way of simplified example, in FIG. 6, there are four subject matter experts, SME1 (643), SME2 (645), SME3 (647) and SME4 (649), each of which has its own communication tools and applications that are the MARE 642, MARE 644, MARE 646 and MARE 648. The MARA values at MARE 642, MARE 644, MARE 646, MARE 648 for each respective subject matter expert are monitored and stored periodically and/or when specifically initiated by prompt to presence server 120.

Although FIG. 6 shows only four subject matter experts, at 660 it is indicated that additional subject matter experts with additional MARE may be present. Indeed, the presence server could monitor and store MARA from a very large number of subject matter experts, as needed. As also indicated by FIG. 6, each subject matter expert may belong to one of more groups. These are typically expertise specialty groups. Here, by way of simplified example, each of SME1 and SME2 is shown as a member of expertise G1. SME3 is shown as a member of G2, while SME4 is shown as a member of both G1 and G2.

The presence server 120 provides MARA for one or more subject matter expert to intelligent presence system (IPS) 110. As shown in FIG. 6, in one embodiment IPS 110 is implemented in a computer with a CPU 110A, with a memory 110B containing software, including operating system 110c, database 200, communication patent analysis module 114 and processing engine module 116. Thus, IPS 120 is configured to receive information from the presence server 120, process it further by the software in IPS 110, and provide the processed results to an application that requests such results.

In the present example the operation of the system and method is explained in terms of a call from a member 602 of ABC health system to the ABC call center 610. For example the member may have questions about healthcare coverage. When the member call leads to a request for information that the call center call handler recognizes as requiring a subject matter expert consultation, the call center call handler will make the subject matter expert consultation request 614 by use of a business application 612, which serves as the recording device for and manager of the consultation request 614.

As there are potentially many forms of expertise that may be needed, the subject matter expert consultation request 614 provides an expertise group identifier EGID 616, which may be a keyword that can be converted into an expertise group name or the group name itself. The subject matter expert consultation request 614 with group identifier EGID 616 may be passed to a subject matter expert Pool Navigation Module 620, which determines the subject matter expert expertise needed and identifies the subject matter expert group where it may be found. In the simplified example of FIG. 6, there are three subject matter expert groups or expert pools G1, G2 and G3. Each group has a member list.

The purpose of a consultation request 614 is to allow the business application to make a communication request to the subject matter expert in the applicable subject matter expert group or pool that is most likely to be available at the time the consultation request is made. Once the correct subject matter expert group is identified, the Navigation Module 620 can ask the IPS 110 to identify the most likely to be available subject matter expert in the applicable subject matter expert group or pool. The IPS 110 then calls on the processing engine module 116 to perform a computation that selects the most appropriate subject matter expert in a particular expertise group or subject matter expert pool, based on current presence data from the presence server 120. The result returned is the identification and/or contacts of that most likely to be available subject matter expert. When this is passed back to the business application 612, it can initiate a communication request to that the most likely to be available subject matter expert.

A specific example of the steps is:
1. A member of ABC health plan 602 calls the health plan's call center 610 to clarify the new health plan coverage options that the member can select during the open enrollment period.
2. The call center agent is able to explain the all options well except some portions of the member's new born baby. The agent finds the need to consult an expert in the benefit department.
3. The agent may put the member in music on hold state or advise the member that the member will receive a return contact. The agent opens a business application 612 with communication application 613 on the desk top. The communication application 613 displays a list of subject matter expert groups, and the agent selects the benefit subject matter expert group (which may be G1).
4. The communication application 613 sends a message to the IPS 110 via a Navigation Module 620 to acquire contact information of the most available subject matter expert in the benefit group, G1.
5. The IPS 110 selects the most available likely to be available subject matter expert in the benefit department, using the process of FIG. 5, and sends a message back to the communication application 613 with an indication of the selected subject matter expert. This may include a preferred communication method, e.g., office phone.
6. Upon receiving the message from the IPS 110, the communication application 613 displays a highlighted subject matter expert with prepared communication method indicator among the list of experts in the benefit group G1.
7. The agent may call the subject matter expert by simply clicking the expert's name in the communication application 613. The agent is able to acquire details of member benefit policy changes from the subject matter expert and address promptly the member's inquiry.

From the above it can be seen that a system as described above can assist a business application or a person using a business application in making a communication request to a needed subject matter expert, by finding in a pool of subject matter experts the one that, based on the subject matter expert's current MARA data and the subject matter expert's historical response pattern associated with that MARA, will have the best probability of responding to the communication request.

In various embodiments and examples, a computer implemented system or method for initiating and facilitating a communication request to a subject matter expert (subject matter expert) in a pool of subject matter experts may include a memory in which are stored for a plurality of subject matter experts a table of availability probabilities, said table being derived (e.g., by a communication pattern analysis module) from each subject matter expert's responses to inquiries issued on a broadcast basis to a pool of subject matter experts, when the subject matter experts are in a plurality of presence states, each state being described by a compound $C_{ijkl}$. Various modules may be included, for example a module for collecting current presence state data of each subject matter expert in a pool and computing from such data $C_{ijkl}$; a module for computing for each of the subject matter experts in the pool, a current availability probability based on the current $C_{ijkl}$ of the subject matter expert; a module for identifying in the pool of subject matter experts the subject matter expert's with the highest current availability probability; and, based on the subject matter experts with the highest current availability probability, a module for initiating a communication request from an application needing a subject matter expert to the subject matter expert with the highest current availability probability.

The communication request may be initiated using a mode of communication, as specified in the subject matter expert's currently computed $C_{ijkl}$. Alternatively, $C_{ijkl}$ may be based on the sensed status of a subject matter expert's office phone, computer/network activity (keyboard), calendared activity; text, and business application status, or at least two or more of the foregoing, or all of the foregoing. A probability value in a data table is derived from broadcast inquiries to subject matter experts, and responses thereto. Values in the tables are updated by response to individual communication requests to each subject matter expert, with highest current availability probability.

In various embodiments, a method for directing questions to available subject matter experts includes storing an expert database in memory, where the database identifies the experts. A process is used to define presence states for each of the subject matter experts, where the presence states describe attributes of the subject matter expert with respect to resource elements.

Inquiries are directed to the experts, and response histograms are populated for each of the subject matter experts based on the inquiries. The response histograms are associated with the presence states of the subject matter experts at a time of the inquiries, and they describe a response probability as a function of the present attributes of the subject matter experts with respect to the resource elements.

Additional embodiments include a computer-implemented method for directing questions to available subject matter experts, the method comprising storing an expert database in memory, the expert database identifying a plurality of subject matter experts. The method further comprises, with a processor in communication with the memory: defining a presence state for each of the subject matter experts, wherein the presence state describes present attributes of the subject matter expert with respect to a plurality of resource elements selected from a telephone, a network, a calendar, and a software application.

The method may also comprise directing inquiries to each of the subject matter experts and populating response histograms based on the inquiries, wherein the response histograms are associated with the presence states of the subject matter experts at a time of the inquiries, such that the histograms describe a probability of response for each subject matter expert as a function of the present attributes of that subject matter expert with respect to the resource elements. The method may also comprise selecting one of the subject matter experts for responding to a question via one of the resource elements, based on the probability of response as defined for the present attributes of the selected subject matter expert with respect to the resource elements, at a time of the selection. The method may also comprise transmitting the question to the selected subject matter expert, for example by utilizing a selected resource element.

While this invention has been described with reference to exemplary embodiments, it will be understood by those skilled in the art that various changes can be made and equivalents may be substituted for elements thereof, without departing from the spirit and scope of the invention. In addition, modifications may be made to adapt the teachings of the invention to particular situations and materials, without departing from the essential scope thereof. Thus, the invention is not limited to the particular examples that are disclosed herein, but encompasses all embodiments falling within the scope of the appended claims.

The invention claimed is:

1. A computer-implemented method for directing inquiries to available subject matter experts, the method comprising:
storing an expert database in memory, the expert database identifying a plurality of subject matter experts; and
with a processor in communication with the memory:
defining a presence state vector for each of the subject matter experts, wherein the presence state vectors comprise a plurality of indices indicative of current states of present attributes of the subject matter experts with respect to a plurality of corresponding resource elements on a network coupled to the processor, wherein at least one of the plurality of corresponding resource elements is a telephone, a calendar application, a messaging application, an email application, or a business software application;
directing inquiries to the subject matter experts;
collecting, within the expert database, real time presence data responsive to the inquiries for each subject matter expert;
determining, using the real time presence data, a scalar value of the presence state vector for each of the subject matter experts;
storing, within the expert database, response histories based on responses to the inquiries, wherein each response history is associated with the scalar value of the presence state vector of a respective subject matter expert at a time the inquiries are directed;
calculating a probability of response by the respective subject matter expert as a function of the present attributes of the associated presence state vector and the response histories;
selecting at least one of the subject matter experts for responding to a question based on the probability of response for the at least one selected subject matter expert, when in the associated presence stated;
selecting one of the resource elements as a mode of communication for transmitting the question to the at least one selected subject matter expert, based on the probability of response in the selected mode of communication;
directing the question to the selected at least one of the subject matter experts; and
updating the response histories by determining a counter variable presence state vector, the counter variable presence state vector based on whether the selected subject matter expert responded to the question when in the current state.

2. The method of claim 1, wherein each presence state vector includes assigned values for each of the present attributes of the respective subject matter expert, and wherein the assigned values indicate which of a plurality of possible attributes describe the current state with respect to each of the corresponding resource elements.

3. The method of claim 2, wherein the plurality of resource elements are selected from the group consisting of: a telephone, a network, a calendar application, a messaging application, an email application, and a business software application.

4. The method of claim 2, wherein the resource elements comprise a keyboard and the possible attributes corresponding to the business software application describe interaction with a software tool being used by the respective subject matter expert.

5. The method of claim 2, wherein the plurality of possible attributes defines a number of possible configurations of the presence state vector with respect to the corresponding resource elements, and wherein the number of possible configurations is at least twenty-four.

6. The method of claim 1, further comprising updating the response histories based on the mode of communication selected for transmitting the question.

7. The method of claim 1, wherein directing inquiries to the subject matter experts comprises broadcasting the inquiries to a functional group of the subject matter experts from whom the responses are sought.

8. The method of claim 7, wherein generating the response histories comprises sampling the presence state vectors for each subject matter expert in the functional group, counting a number of times each possible configuration of the presence state vector is encountered, and counting a number of times each subject matter expert responded when in a given configuration.

9. A computer-implemented inquiry server system comprising:
   a database comprising memory configured for storing response histories associated with a plurality of respective subject matter experts;
   a physical processor in communication with the database, the processor configured for:
     defining a presence state vector corresponding to each of the subject matter experts, wherein the presence state vector describes present attributes of each subject matter expert with respect to a plurality of resource elements on a network coupled to the processor, wherein at least one of the plurality of resource elements is a telephone, a calendar application, a messaging application, an email application, or a business software application, the physical processor further configured for:
     determining a scalar value of the presence state vector for each of the subject matter experts;
     calculating a response probability for each subject matter expert as a function of the scalar value of the presence state vectors and the response histories;
     selecting one of the plurality of resource elements for sending an inquiry to at least one of the subject matter experts, based on the response probability of at least one selected subject matter expert when in a current presence state;
     collecting real time presence data responsive to the inquiry; and
     updating the response histories by determining a counter variable presence state vector for each selected subject matter expert to which an inquiry is directed, the counter variable state vector based on whether the at least one selected subject matter expert responded to the inquiry; and
   a server in communication with the processor, the server configured for sending the inquiry to at least one of the subject matter experts, wherein the at least one subject matter expert is selected based on the response probability of the at least one selected subject matter expert when in the current presence state.

10. The system of claim 9, wherein the present attributes are selected from a plurality of possible attributes indicating whether the at least one selected subject matter expert is interacting with each of the plurality of resource elements.

11. The system of claim 9, wherein the plurality of possible attributes indicate keyboard activity of the at least one selected subject matter expert interacting with at least one of plurality of resource elements.

12. The system of claim 9, wherein sending the inquiry comprises broadcasting the inquiry to a functional group of the subject matter experts from whom a response is sought.

13. The system of claim 12, further comprising sampling the current presence state of each respective subject matter expert in the functional group and updating the response histories by counting a number of times each respective subject matter expert responded, when in the current presence state.

14. The system of claim 9, further comprising supplementing the response histories to indicate the response probability based on a mode of communicating the inquiry to the at least one selected subject matter expert, the mode of communication selected from at least one of the plurality of resource elements.

15. A non-transitory computer readable medium having program code stored thereon, the program code executable on a computer processing system to perform a method comprising:
   storing response histories associated with a plurality of respective subject matter experts in a database, wherein the response histories comprise historical data for each respective subject matter expert;
   defining, for each subject matter expert, a presence state of a respective subject matter expert in a presence state vector of the respective subject matter expert, the presence state vector comprising entries, each entry corresponding to a present attribute indicating whether or how the respective subject matter expert is presently interacting with a respective resource element of a plurality of resource elements on a network coupled to the processor, wherein at least one of the plurality of resource elements is a telephone, a calendar application, a messaging application, an email application, or a business software application;
   collecting real time presence data responsive to inquiries transmitted to each subject matter expert;
   determining, using the real time presence data, a scalar value of the presence state vector for each of the subject matter experts;
   calculating a response probability for mode of communication of each subject matter expert as a function of the response history and the scalar value of the presence state vector of the respective subject matter expert;
   selecting a mode of communication for sending an inquiry to at least one of the subject matter experts, wherein the at least one subject matter expert is selected based on the response probability associated with a current presence state of the at least one of the subject matter experts, and wherein the mode of communication is selected based on the response probability in the selected mode;
   sending the inquiry to the selected subject matter expert via the selected mode of communication; and
   updating the response histories by determining a counter variable presence state vector, the counter variable presence state vector based on whether the selected subject matter expert responded to the inquiry when in the current presence state.

16. The non-transitory computer readable medium of claim 15, wherein the resource elements are selected from a plurality of a telephone, a network, a calendar application, a messaging application, an email application, a keyboard and a business software application, and wherein the present attributes define one of a plurality of possible configurations of the presence state with respect to each the resource elements.

\* \* \* \* \*